United States Patent
Vranjes et al.

(10) Patent No.: US 11,294,529 B2
(45) Date of Patent: Apr. 5, 2022

(54) APPLICATION WINDOW DIVIDER CONTROL FOR WINDOW LAYOUT MANAGEMENT

(71) Applicant: Microsoft Technology Licensing, LLC, Redmond, WA (US)

(72) Inventors: Miron Vranjes, Seattle, WA (US); Jesse Clay Satterfield, Seattle, WA (US); Matthew Isaac Worley, Bellevue, WA (US); Chaitanya Sareen, Seattle, WA (US); Nils Anders Sundelin, Bothell, WA (US); Abhishek Malani, Redmond, WA (US); Alice Steinglass, Bellevue, WA (US); Robert James Jarrett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/863,369

(22) Filed: Apr. 15, 2013

(65) Prior Publication Data
US 2014/0310646 A1    Oct. 16, 2014

(51) Int. Cl.
*G06F 3/0481* (2013.01)
*G06F 3/048* (2013.01)
*G06F 9/451* (2018.01)

(52) U.S. Cl.
CPC .............. *G06F 3/048* (2013.01); *G06F 9/451* (2018.02)

(58) Field of Classification Search
CPC ...................... G06F 3/0481; G06F 2203/04803
See application file for complete search history.

(56) References Cited

U.S. PATENT DOCUMENTS

| | | | |
|---|---|---|---|
| 5,712,995 A * | 1/1998 | Cohn | G06F 3/0481 715/792 |
| 5,880,725 A | 3/1999 | Southgate | |
| 5,920,315 A * | 7/1999 | Santos-Gomez | G06F 3/0481 715/792 |

(Continued)

FOREIGN PATENT DOCUMENTS

| | | |
|---|---|---|
| EP | 2987077 A1 | 2/2016 |
| KR | 101099317 B1 | 1/2008 |

(Continued)

OTHER PUBLICATIONS

International Searching Authority, U.S. Patent and Trademark Office, International Search Report for PCT/US2013/060247, dated Dec. 10, 2013, 4 pages.

(Continued)

*Primary Examiner* — Justin S Lee

(57) ABSTRACT

An application window divider control is shared by a first application window and a second application window in a user interface. Based on a received directional instruction that moves the application window divider control along an axis of the user interface, placement of the first application window and the second application window may be positioned across a range of consistently spaced points along an axis of the user interface. Placement adjustment can also impact other application windows in the user interface. The application window divider control may also snap to provide "magnetic" points along the axis when certain conditions are satisfied.

20 Claims, 8 Drawing Sheets

(56) References Cited

U.S. PATENT DOCUMENTS

| | | | | |
|---|---|---|---|---|
| 6,008,809 | A * | 12/1999 | Brooks | G06F 3/0481 715/792 |
| 6,195,094 | B1 * | 2/2001 | Celebiler | G06F 3/0481 715/764 |
| 6,661,436 | B2 * | 12/2003 | Barksdale | G06F 3/0481 715/788 |
| 7,890,882 | B1 * | 2/2011 | Nelson | G06F 3/0481 715/788 |
| 7,904,832 | B2 | 3/2011 | Ubillos | |
| 2002/0191028 | A1 | 12/2002 | Senechalle et al. | |
| 2006/0020903 | A1 * | 1/2006 | Wang | G06F 3/0481 715/792 |
| 2006/0174568 | A1 | 8/2006 | Kinoshita et al. | |
| 2008/0126989 | A1 * | 5/2008 | Flores | G06F 3/04855 715/833 |
| 2011/0119597 | A1 | 5/2011 | Yellamraju et al. | |
| 2012/0054674 | A1 * | 3/2012 | Beykpour | G06F 3/0481 715/788 |
| 2012/0064674 | A1 | 3/2012 | Sandhu et al. | |
| 2012/0166980 | A1 * | 6/2012 | Yosef | G06F 17/00 715/762 |
| 2012/0299968 | A1 * | 11/2012 | Wong | G06F 3/04883 345/661 |
| 2013/0024805 | A1 * | 1/2013 | In | G11B 27/34 715/781 |
| 2013/0060247 | A1 | 3/2013 | Sklar et al. | |
| 2013/0120295 | A1 * | 5/2013 | Kim | G06F 3/0481 345/173 |
| 2013/0254708 | A1 * | 9/2013 | Dorcey | H04L 51/04 715/788 |
| 2014/0310646 | A1 | 10/2014 | Vranjes et al. | |

FOREIGN PATENT DOCUMENTS

| | | |
|---|---|---|
| RU | 2360284 C2 | 6/2009 |
| WO | 2008090902 A1 | 7/2008 |
| WO | 2012166182 A1 | 12/2012 |
| WO | 2014171963 A1 | 10/2014 |

OTHER PUBLICATIONS

International Searching Authority, U.S. Patent and Trademark Office, Written Opinion for PCT/US2013/060247, dated Dec. 10, 2013, 6 pages.

Cohen, et al., "Automatic Strategies in the Siemens RTL Tiled Window Manager", Retrieved at <<http://ieeexplore.ieee.org/stamp/stamp.jsp?tp=&arnumber=4808>>, in Proceedings of 2nd IEEE Conference on Computer Workstations, Mar. 7, 1988, pp. 9.

Kandogan, et al., "Elastic Windows: Improved Spatial Layout and Rapid Multiple Window Operations", Retrieved at <<http://drum.lib.umd.edu/bitstream/1903/439/2/CS-TR-3522.pdf>>, In Proceedings of the Workshop on Advanced Visual Interfaces, May 27, 1996, pp. 10.

"Manage Multiple Windows", Retrieved at <<http://windows.microsoft.com/en-hk/windows7/manage-multiple-windows>>, Retrieved Date : Feb. 28, 2013, pp. 5.

Muller, Hans., "MultiSplitPane: Splitting Without Nesting", Retrieved at <<http://today.java.net/pub/a/today/2006/03/23/multi-split-pane.html>>, Mar. 23, 2006, pp. 6.

"Office Action Issued in Colombia Patent Application No. 15263003", dated Nov. 12, 2015, 3 Pages. (w/o English Translation).

"Office Action Issued in European Patent Application No. 13780431.6", dated May 11, 2018, 5 Pages.

"Office Action Issued in Colombian Patent Application No. 15263003", dated May 15, 2017, 17 Pages.

"Office Action Issued in Australian Patent Application No. 2013386836", dated Dec. 21, 2018, 3 Pages.

"First Office Action and Search Report Issued in Chinese Patent Application No. 201380075620.5", dated Nov. 30, 2017, 12 Pages.

"Second Office Action and Search Report Issued in Chinese Patent Application No. 201380075620.5", dated Oct. 15, 2018, 12 Pages.

"Office Action Issued in Russian Patent Application No. 2015144183", dated Sep. 7, 2017, 8 Pages.

"Office Action Issued in Japanese Patent Application No. 2016-507531", dated May 23, 2017, 8 Pages.

"Office Action Issued in Israel Patent Application No. 241765", dated Jul. 26, 2018, 5 Pages.

"Office Action Issued in Chile Patent Application No. 3057-2015", dated Jan. 11, 2018, 5 Pages. (W/o English Translation).

"Office Action Issued in Chile Patent Application No. 3057-2015", dated Aug. 2, 2017, 6 Pages.

"Office Action Issued in Mexican Patent Application No. MX/a/2015/014579", dated Mar. 16, 2017, 5 Pages.

"Office Action Issued in Mexican Patent Application No. MX/a/2015/014579", dated Jun. 12, 2018, 10 Pages.

"Office Action Issued in Mexican Patent Application No. MX/a/2015/014579", dated Oct. 12, 2017, 7 Pages.

"Office Action Issued in Malaysian Patent Application No. PI 2015703699", dated Dec. 26, 2018, 2 Pages.

"Office Action Issued in Chinese Patent Application No. 201380075620.5", dated May 10, 2019, 24 Pages.

"Office Action Issued in Australian Patent Application No. 2013386836", dated Apr. 8, 2019, 3 Pages.

"Office Action Issued in Philippines Patent Application No. 1-2015502311", dated Jan. 15, 2019, 5 Pages.

"Office Action Issued in New Zealand Patent Application No. 712845", dated Jan. 24, 2019, 4 Pages.

"Office Action Issued in Mexican Patent Application No. MX/a/2015/014579", dated Feb. 20, 2019, 7 Pages.

"Office Action Issued in Australian Patent Application No. 2013386836", dated Jul. 5, 2019, 4 Pages.

"Office Action Issued in Canada Patent Application No. 2908006", dated Jul. 12, 2019, 6 Pages.

"Office Action Issued in Indonesian Patent Application No. P00201506533" dated Jul. 15, 2019, 4 Pages.

"Office Action Issued in Israel Patent Application No. 241765", dated Jul. 22, 2019, 5 Pages.

"Office Action Issued in New Zealand Patent Application No. 712845", dated Aug. 13, 2019, 5 Pages.

"Office Action issued in Korean Patent Application No. 10-2015-7032167", dated Aug. 14, 2019, 10 Pages "Office Action issued in Chinese Patent Application No. 201380075620.5", dated Aug. 26, 2019, 7 Pages.

"Office Action Issued in Australian Patent Application No. 2013386836", dated Nov. 1, 2019, 4 Pages.

"Office Action Issued in New Zealand Patent Application No. 712845", dated Nov. 18, 2019, 1 Page.

"Office Action Issued in European Patent Application No. 13780431.6", dated Nov. 26, 2019, 3 Pages.

"Office Action Issued in Canadian Patent Application No. 2908006", dated May 13, 2020, 3 Pages.

"Office Action Issued in Australian Patent Application No. 2013386836", dated Dec. 12, 2019, 6 Pages.

"Office Action Issued in Brazilian Patent Application No. BR112015025939-1", dated Jan. 27, 2020, 5 Pages.

"Office Action Issued in Indian Patent Application No. 6305/CHENP/2015", dated Jun. 22, 2020, 7 Pages.

"Office Action Issued in Chinese Patent Application No. 201380075620.5", dated Feb. 26, 2021, 10 Pages.

"Office Action Issued in Canadian Patent Application No. 2,908,006", dated Jan. 28, 2021, 6 Pages.

"Office Action Issued in Chinese Patent Application No. 201380075620.5", dated Jun. 29, 2021, 16 Pages.

"Office Action Issued in Chinese Patent Application No. 201380075620.5", dated Apr. 28, 2021, 4 Pages.

* cited by examiner

APPLICATION WINDOW DIVIDER CONTROL FOR WINDOW LAYOUT MANAGEMENT

BACKGROUND

A computer operating system, including its corresponding user interface, allows a user to adjust an application window for presentation to the user through the user interface. However, such user-directed adjustments come with inconvenient limitations, particularly as user interfaces become more modern and flexible.

SUMMARY

Implementations described and claimed herein address the foregoing problems by providing an application window divider control that is shared by a first application window and a second application window in a user interface. Based on a received directional instruction that moves the application window divider control along an axis of the user interface, placement of the first application window and the second application window may be positioned across a range of consistently spaced points along an axis of the user interface. Placement adjustment can also impact other application windows in the user interface. The application window divider control may also snap to provide "magnetic" points along the axis when certain conditions are satisfied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Launching an application window includes without limitation initially executing the application and switching to a new or hidden application window of an already executing application. In addition, an application window may include without limitation a window of the operating system components, an operating system utility, and a special purpose application program (e.g., a Web browser program, a word processing program, a spreadsheet program).

Figure 1:
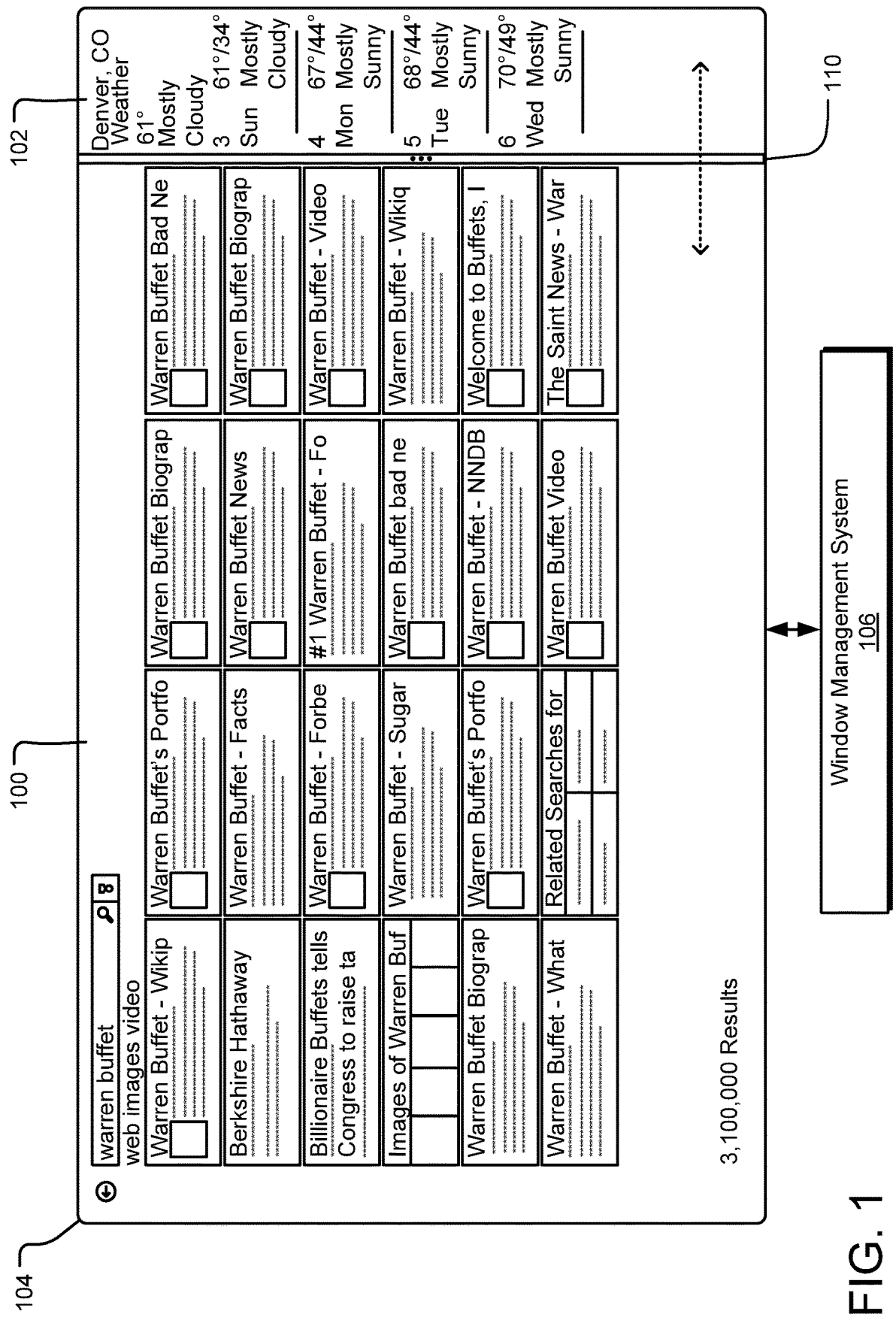
FIG. 1 illustrates two application windows sharing an application window divider control in an example user interface screen.

FIG. 1 illustrates two application windows 100 and 102 sharing an application window divider control 110 in an example user interface screen 104. A window management system 106 is typically a component of an operating system or user interface environment but could also be an independent application. The window management system 106 manages the display, placement, layout, appearance, and other aspects of the application windows 100 and 102, as well as other windows and user interface characteristics and operations.

The application window 100 presents a search result window displaying search results from a Web search engine. The individual search results (such as a search result 108) includes representative text and/or one or more images along with a browser navigable link, which can be selected by the user for navigation to a Web site identified by the browser navigable link. The application window 102 presents results from a weather application or Web site, including a 4-day forecast of weather in Denver, Colo. A window boundary control 110 divides the displayed area of the application window 100 and displayed area of the application window 102, in the illustrated case, separating the application windows. In some implementations, the window boundary control 110 may be manipulated by the user to change the size and/or location of one or both windows.

The application windows 100 and 102 are shown in FIG. 1 as being non-overlapping windows. However, the described technology is not limited to non-overlapping windowing environments. For example, in such environments, each application window in an overlapping windowing environment may be bounded by a window boundary control, which can be manipulated by the user to change the location, size, and front-to-back ordering (collectively, "placement") of the potentially overlapping windows (e.g., the z-ordering of the windows). The window management system 106 receives input through the application windows 100 and 102 and through other user interface components (e.g., the keyboard interface, a touch screen interface, a voice interface, and pointing device) and displays the applications windows 100 and 102, the window boundary control 110, and other application windows and controls through the user interface.

The window boundary control 110 represents a divider between the two distinct application windows 100 and 102 or between an application window and an empty space in the user interface, and therefore may also be referred to as an "application window divider control." The application window divider control may be manipulated through the user interface to communicate changes in the size of an application window (with respect to an empty space) or in the relative sizes of the application windows 100 and 102 to the window management system 106. Accordingly, functionality of the application window divider control represents a window management system control that, rather than being a component of one application window or another, provides an external boundary of one or more application windows and, in some configuration, may be shared by the two or more application windows as part of the user interface and window management system 106.

In one implementation, two or more application window divider controls may merge together to form a single application window divider control. For example, two application windows may be presented along a horizontal axis of a user interface, separated by an empty space. In this scenario, each application is displayed with an application window divider control between the application window and the empty space. If one of the application window divider controls is dragged to the other application window divider control, the empty space is filled with the expanded application window and the two application window divider controls merge into a single application window divider control within the user interface. In addition, the two application window divider controls can "snap" into a single application window divider control when the empty space between then narrows to a minimum empty space width.

Although FIG. 1 illustrates a non-overlapping windowing environment, overlapping windowing environments may also employ an application window divider, whether as a window management system control dividing one application window from another or dividing/bounding an application window relative to an empty space in the user interface or another application window partially occluded by the application window.

A user can select the application window divider control (e.g., via a touch screen, a pointing device, keyboard input) and drag it right and left along a wide range of relatively continuous locations along the horizontal extent of the user interface. For example, a user can give the application window divider control focus (e.g., by selecting it), and then the user can move the application window divider control by depressing or otherwise activating a keyboard input (e.g., an arrow key) until the application window divider control is at a desired location along the axis. In one implementation, the relatively continuous locations comprise tightly and consistently spaced points along the horizontal axis (e.g., each point separated from an adjacent point by a small number of pixels or some other visually continuous spacing). It should be understood that alternative implementations may provide relatively continuous window divider control along the vertical extent of the user interface or along some other axis. A user interface may also include multiple application window divider controls, some of which may intersect on different axes.

In one implementation, responsive to the user-induced movement of the application window divider control in a horizontal direction, the user interface provides a visual cue suggesting the continuous relative sizing of the application windows 100 and 102. For example, the application window divider control itself moves, at least one of the application windows appears to resize dynamically, or some other user-friendly suggestion of resizing is animated in the user interface. In one implementation, the application windows may be represented during resizing as snapshots of each window captured at or near the initiation of the directional instruction. In another implementation, the application windows may be represented during resizing as live application windows or other window placeholder representations.

When the user commits to the resizing (e.g., removes his or her touch, deselects the pointing device button, etc.), then both application windows snap into place at the relative sizes designated by the last location of the application window divider control. In another implementation, responsive to the user-induced movement of the application window divider control in a horizontal direction, the adjacent sides of the application windows 100 and 102 move in visual conformity with the application window divider control. For example, the application window divider moves continuous and both application windows 100 and 102 resize dynami-cally. When the user commits to the resizing (e.g., removes his or her touch, deselects the pointing device button, etc.), then both application windows remain at the relative sizes designated by the last location of the application window divider control.

Figure 2:
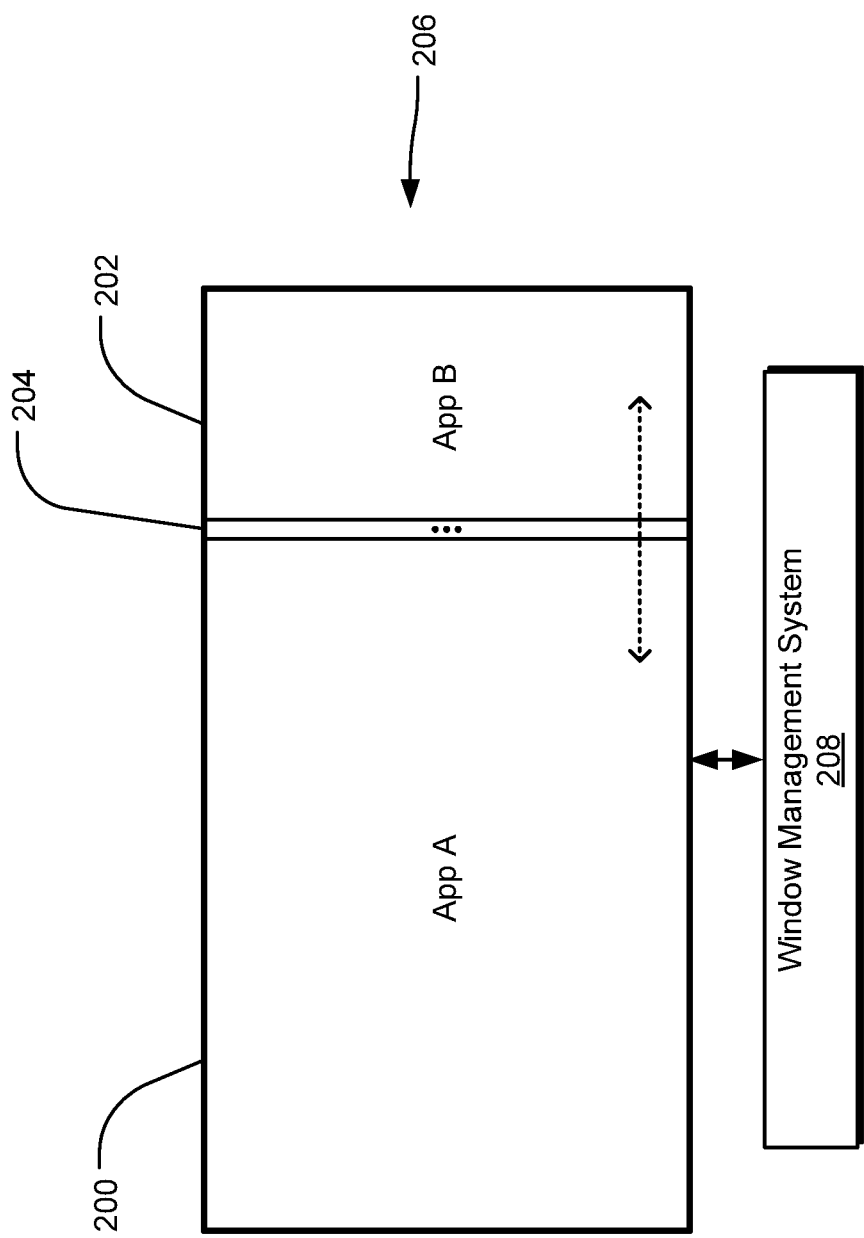
FIG. 2 illustrates a schematic of two application windows sharing an application window divider control in an example user interface.

FIG. 2 illustrates a schematic of two application windows (e.g., application window 200 for App A and application window 202 for App B) sharing an application window divider control 204 in an example user interface 206. The application window divider control 204 is shared by the application windows 200 and 202 but is not a component of either application window. The application window divider control 204 is a control of a window management system 208, which manages the display, placement, layout, appearance, and other aspects of the application windows 200 and 202, as well as other windows and user interface characteristics and operations. The window management system 208 manages the user manipulation of the application window divider control 204, including the receipt of user input (e.g., a directional instruction, such as a drag), the mutual resizing of the application windows 200 and 202, and the presentation of the application windows 200 and 202 within the user interface 206.

As shown in FIG. 2, the application window divider control 204 can be moved along the horizontal axis of the user interface 206 in response to a user-provided directional instruction. Upon completion of the directional instruction (e.g., the user commits to the dragging of the application window divider control by lifting a finger from the touch screen), the application windows 200 and 202 adjust their placement in according to the end point of the direction instruction (e.g., the location of the application window divider control 204 along the axis when the directional instruction is completed). In FIG. 2, this placement adjustment would result in the complimentary resizing of the application windows 200 and 202 based on the final location of the application window divider control 204.

Figure 3:
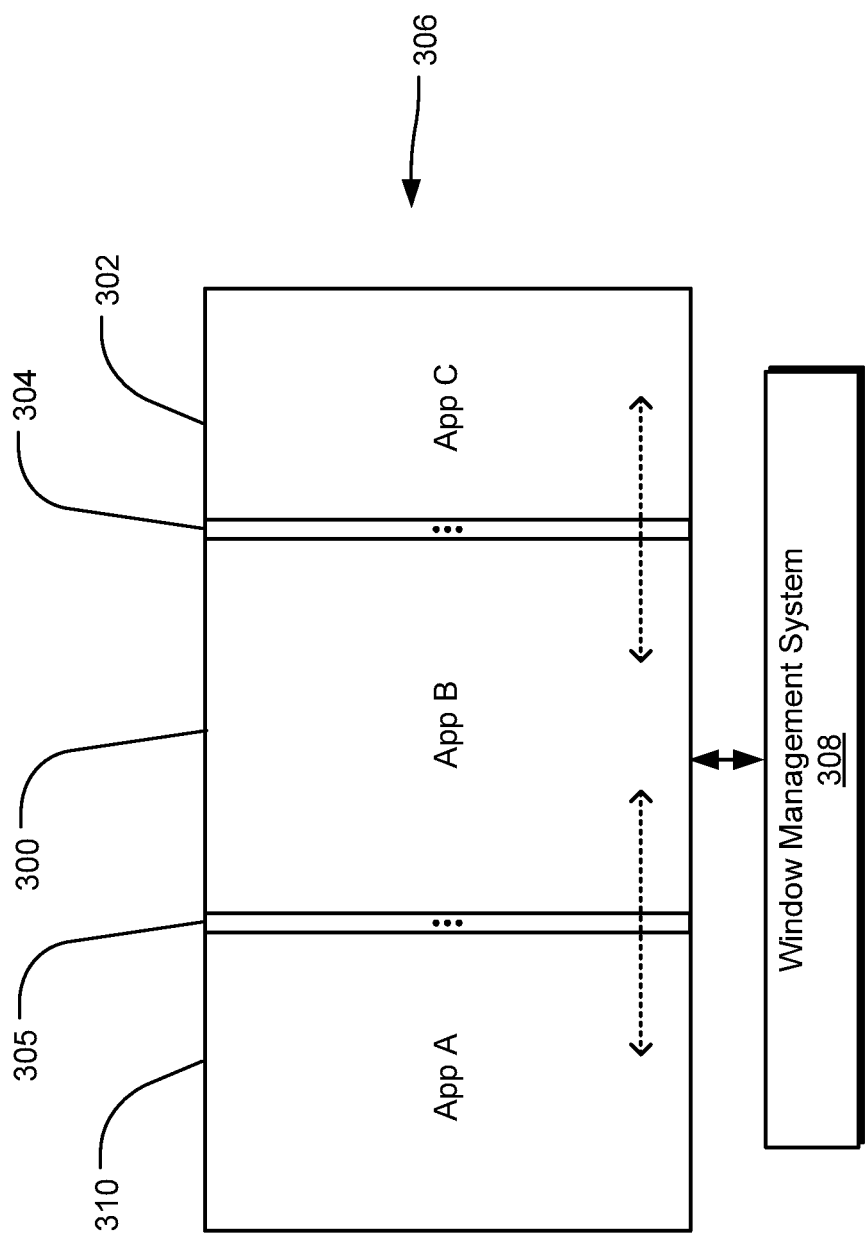
FIG. 3 illustrates a schematic of two application windows sharing an application window divider control and a third application window in an example user interface.

FIG. 3 illustrates a schematic of two application windows (e.g., application window 300 for App B and application window 302 for App C) sharing an application window divider control 304 and a third application window (e.g., application window 310 for App A) in an example user interface 306. The application window divider control 304 is shared by the application windows 300 and 302 but is not a component of either application window. Another application window divider control 305 is also presented in the user interface 306 and is shared by the application windows 310 and 300. The application window divider controls 304 and 305 are controls of a window management system 308, which manages the display, placement, layout, appearance, and other aspects of the application windows 300, 302, and 310, as well as other windows and user interface characteristics and operations. The window management system 308 manages the user manipulation of the application window divider controls 304 and 305, including the receipt of user input (e.g., a directional instruction, such as a drag), the mutual resizing of the application windows 300 and 302 based on the application window divider control 304, the mutual resizing of the application windows 300 and 310 based on the application window divider control 305, and the presentation of the application windows 300, 302, and 310 within the user interface 306.

As shown in FIG. 3, the application window divider controls 304 and 305 can be moved along the horizontal axis of the user interface 306 in response to a user-provided directional instruction. Upon completion of the directional instruction (e.g., the user commits to the dragging of the application window divider control by lifting a finger from the touch screen) relating to the application window divider control 304, the window management system 308 adjusts the placements of the application windows 300 and 302 in accordance with the end point of the direction instruction (e.g., the location of the application window divider control 304 along the axis when the directional instruction is completed). In FIG. 3, this placement adjustment would result in the complimentary resizing of the application windows 300 and 302 based on the final location of the application window divider control 304. A similar behavior for application windows 300 and 310 would occur responsive to a directional instruction provided to the application window divider control 305. In addition, each application window divider control 304 and 305 may also impact placement of application windows that it does not share (e.g., divide). For example, in some circumstances, a directional instruction to the application window divider control 304 can cause a placement adjustment to the application window 310, as described below.

Figure 4:
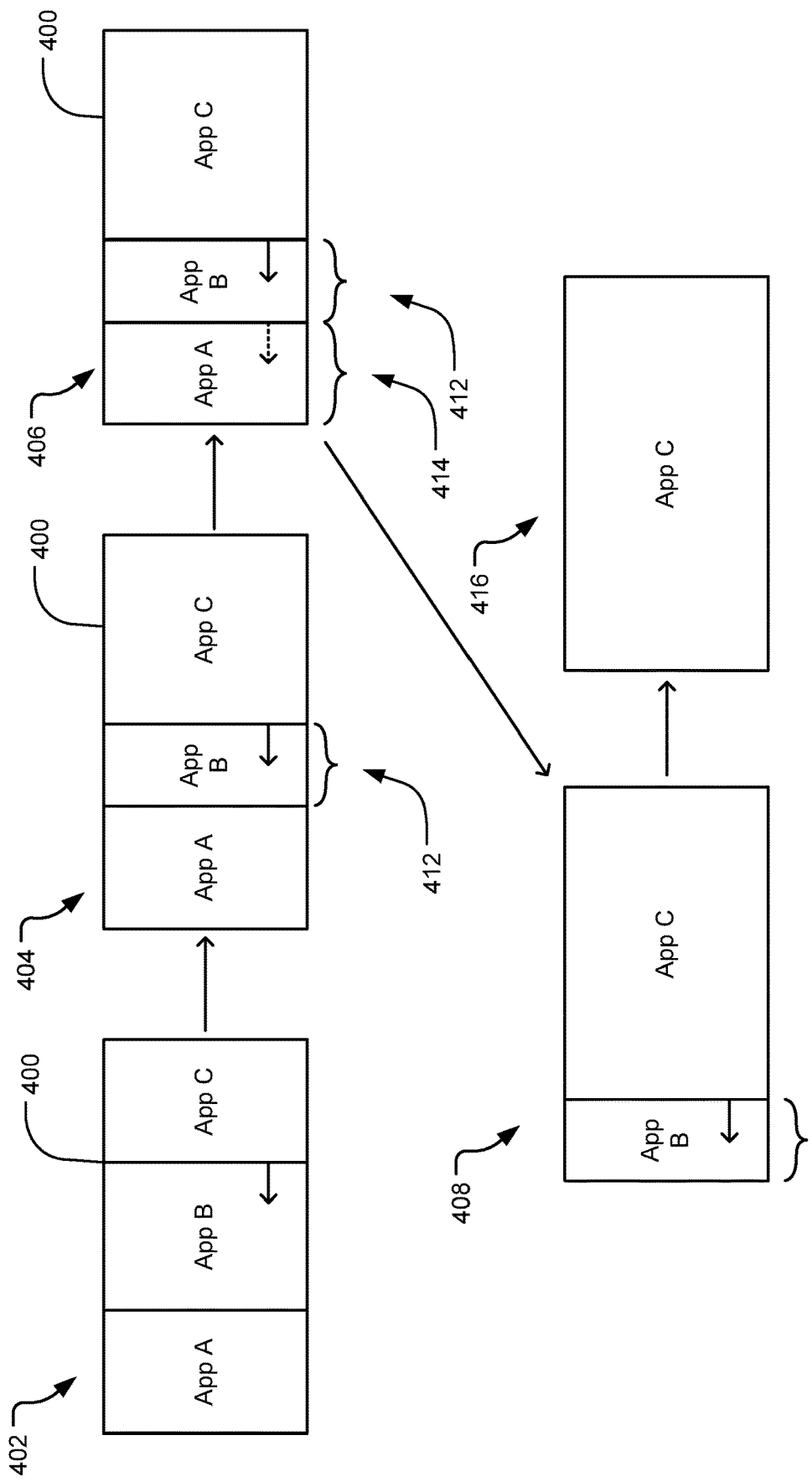
FIG. 4 illustrates an example sequence of user interface operations implementing an application window divider control.

FIG. 4 illustrates an example sequence of user interface operations implementing an application window divider control 400. At 402, a user interface presents application windows for App A, App B, and App C. A directional instruction is provided to the application window divider control 400, moving it in the left direction toward App B and App A and adjusting the placement (e.g., the sizing) of the application window for App B (e.g., decreasing its width) and adjusting the placement (e.g., the sizing) of the application window for App C (e.g., increasing its width). At 404, the placement of the application window for App B has satisfied a minimum size condition 412—once the width of the application window for App B decreases to a given width threshold, which may be statically or dynamically determined, the width of the application window for App B does not continue to decrease.

Instead, as shown at 406, the continuing directional instruction causes the application window for App A to adjust its placement (e.g., decreasing its width), while the width of the application window for App B remains at its minimum size condition 412. When the placement of the application window for App A has satisfied its minimum size condition 414, the width of the application window for App A also stops decreasing.

Accordingly, the continuation of the directional instruction has decreased the widths of the applications windows for App A and App B to their minimum size conditions 414 and 412 respectively. Therefore, at 408, the continuation of the directional instruction causes the application window for App A to be removed from the user interface. In one implementation, the application window for App A is animated to appear to be pushed out of the left edge of the user interface (e.g., in the direction of the directional instruction).

At 416, the directional instruction continues to cause the application window for App B to be removed from the user interface. In one implementation, the application window for App B is animated to appear to be pushed out of the left edge of the user interface (e.g., in the direction of the directional instruction).

At each stage in the operational flow in FIG. 4, the directional instruction can be completed (e.g., by the user lifting a finger off of the touch screen, by the user removing a finger from the depressed button of a pointing device, by the user providing an appropriate keyboard input to complete the directional instruction). At any point along the axis in the user interface that an application window divider control is located when the directional instruction is completed, the window management system presents the placement of the application windows in accordance with the placement of the corresponding application window divider controls.

In one implementation, the window management system records previous window sizes and placements to allow a user to undo one or more resizing operations.

Figure 5:
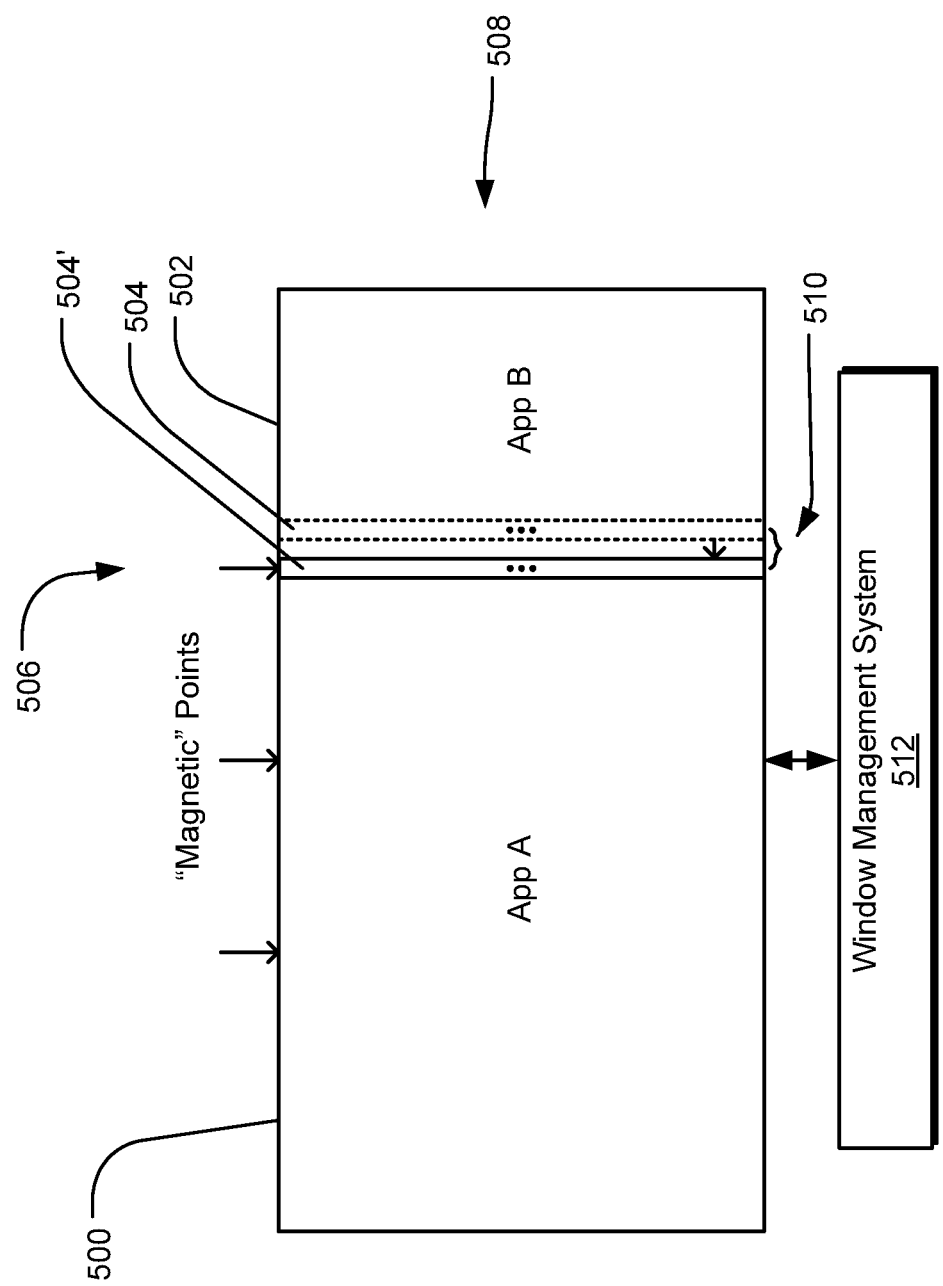
FIG. 5 illustrates a schematic of two application windows sharing an application window divider control at a magnetic point in an example user interface.

FIG. 5 illustrates a schematic of two application windows 500 and 502 sharing an application window divider control 504 at a magnetic point 506 in an example user interface 508. The application window divider control 504 is shared by the application windows 500 and 502 but is not a component of either application window. The application window divider control 504 is a control of a window management system 512, which manages the display, placement, layout, appearance, and other aspects of the application windows 500 and 502, as well as other windows and user interface characteristics and operations. The window management system 512 manages the user manipulation of the application window divider control 504, including the receipt of user input (e.g., a directional instruction, such as a drag), the mutual resizing of the application windows 500 and 502, and the presentation of the application windows 500 and 502 within the user interface 508.

As shown in FIG. 5, the application window divider control 504 can be moved along the horizontal axis of the user interface 508 in response to a user-provided directional instruction. Based a completion of the directional instruction (e.g., the user commits to the dragging of the application window divider control by lifting a finger from the touch screen), the application windows 500 and 502 adjust their placement in according to the end point of the direction instruction (e.g., the location of the application window divider control 504 along the axis when the directional instruction is completed). In FIG. 5, this placement adjustment would result in the complimentary resizing of the application windows 500 and 502 based on the final location of the application window divider control 504.

In addition, FIG. 5 shows three "magnetic" points along the horizontal axis of the user interface 508, although any number of magnetic points is contemplated. Each magnetic point represents a position on the horizontal axis of the user interface 508 to which the application window divider control 504 is pulled when, during a directional instruction, the movement of the application window divider control 504 satisfies a speed condition (e.g., movement slows below a speed threshold) and/or a distance condition (e.g., movement brings the application window divider 504 within a given distance threshold 510 from the magnetic point). For example, as the application window divider control 504 is moved from the left to the right across the horizontal axis of the user interface 508, the user can slow the movement near the magnetic point 506, which can cause the application window divider control 504 to snap to its location shown as 504'.

The location of the magnetic points may be determined statically for a set of visible application windows or dynamically during a directional instruction. For example, a statically determined magnetic point may be located at the center of the horizontal axis when two application windows are visible or magnetic points may be placed at thirds along the horizontal axis when three application windows are visible. In contrast, the location of some magnetic points may be determined dynamically during a directional instruction. For example, responsive to initiation of the directional instruction, the window management system can calculate the locations of any magnetic points along the axis, and in some implementations, the locations may be dynamically updated as the directional instruction continues to be executed, subject to application window placement preferences and other constraints. Eventually, when the directional instruction is committed, the application window divider controls will snap to the dynamically calculated locations of the magnetic points.

The term "snap" describes moving the application window divider control 504 to align with the magnetic point 506 along the axis when the application window divider control 504 is not initially aligned with the magnetic point 506 but the movement of the application window divider control 504 satisfies a speed condition and a distance condition relative to the magnetic point 506. Visually, in one implementation, this snapping operation appears as a relatively rapid movement or jump by the application window divider control 504 to align with the magnetic point 506. Although, in alternative implementations, the snapping operation can be presented through the user interface 508 in other ways (e.g., the snapping of window boundaries, the rapid movement of ghost images of application windows, etc.).

It should be understood that various types of magnetic points may be employed. In one example, magnetic points may be positioned to maintain consistent horizontal and/or sizing of application windows (e.g., each of three windows have the same width). In another example, minimum and maximum windows sizes, user-defined size preferences, and system defined window preferences may also be considered in the placement of magnetic points along an axis within the user interface.

In one implementation, one or more application window divider controls may be automatically snapped to appropriate magnetic points via a double-click, a double-tap, or a key combination on or in relation to one of the application window divider controls. Such user input can instruct one or more application window divider controls to move in an appropriate direction to snap to the nearest magnetic point, subject to application window placement preferences and other constraints. In one implementation, repeating the user input on the same application window divider control causes the application window divider controls of the visible application windows within the user interface to move in appropriate directions to snap to the nearest magnetic points, subject to application window placement preferences, and other constraints.

Figure 6:
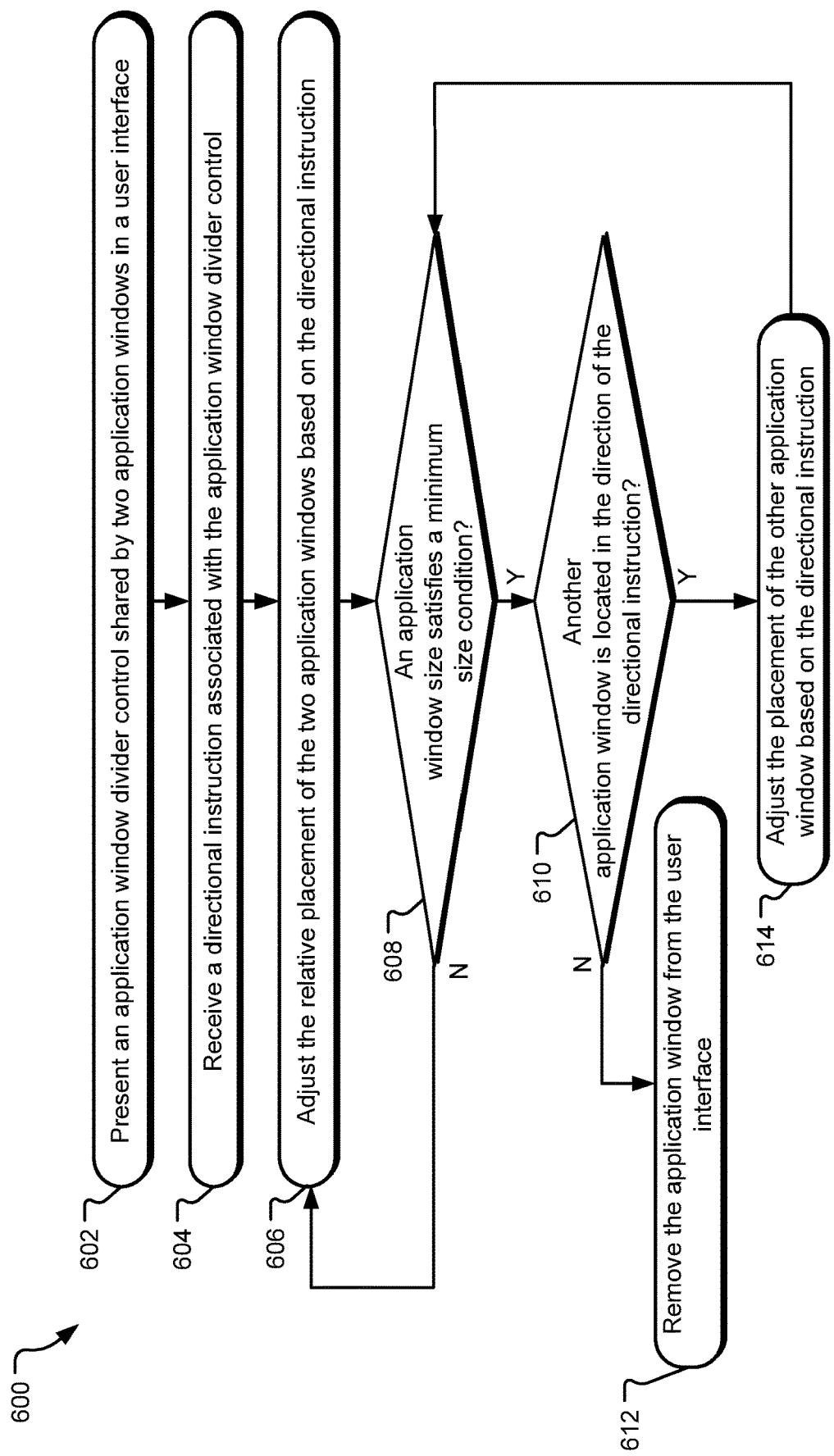
FIG. 6 illustrates example operations for adjusting placement of two application windows using an application window divider control.

FIG. 6 illustrates example operations 600 for adjusting placement of two application windows using an application window divider control. A presenting operation 602 presents an application window divider control shared by two application windows in a user interface. In one implementation, the application window divider control separates or acts as a boundary between the two application windows. An instruction operation 604 receives a directional instruction (e.g., a drag gesture) in association with the application window divider control. An adjusting operation 606 adjusts the relative placement of the two application windows based on the directional instruction applied to the application window divider control. For example, one application window gets narrower and the other application window gets wider within the user interface as the application window divider control moves or after its movement is completed.

A decision operation 608 determines whether one of the application windows has been sized to satisfy a minimum size condition (note: different application windows can have different minimum size conditions). If not, the adjusting operation 606 continues processing the directional instruction. If the decision operation 608 determines whether one of the application windows has satisfied a minimum size condition, that application window stops getting narrower, and another decision operation 610 determines whether another application window is located in the direction of the directional instruction within the user interface. If not, the application window satisfying the minimum size condition is removed from the user interface in a removal operation 612. Otherwise, another adjusting operation 610 adjusts the placement of the other application window based on the directional instruction. In one implementation, the visual effect of the adjusting operation 610 resembles the first minimum window freezing at its minimum width and starting to push the side of the next window so that the next window gets narrower.

It should be understood that the next window may also reach a width that satisfies its minimum width condition. Accordingly, if the directional instruction continues in the same direction, then the next minimum window may be removed from the user interface in a manner similar to that discussed with regard to the removal operation 612. Further, subsequent to removal of the next minimum window and subject to a continued directional instruction in the same direction, the first minimum window may be removed in a manner similar to that discussed with regard to the removal operation 612.

Figure 7:
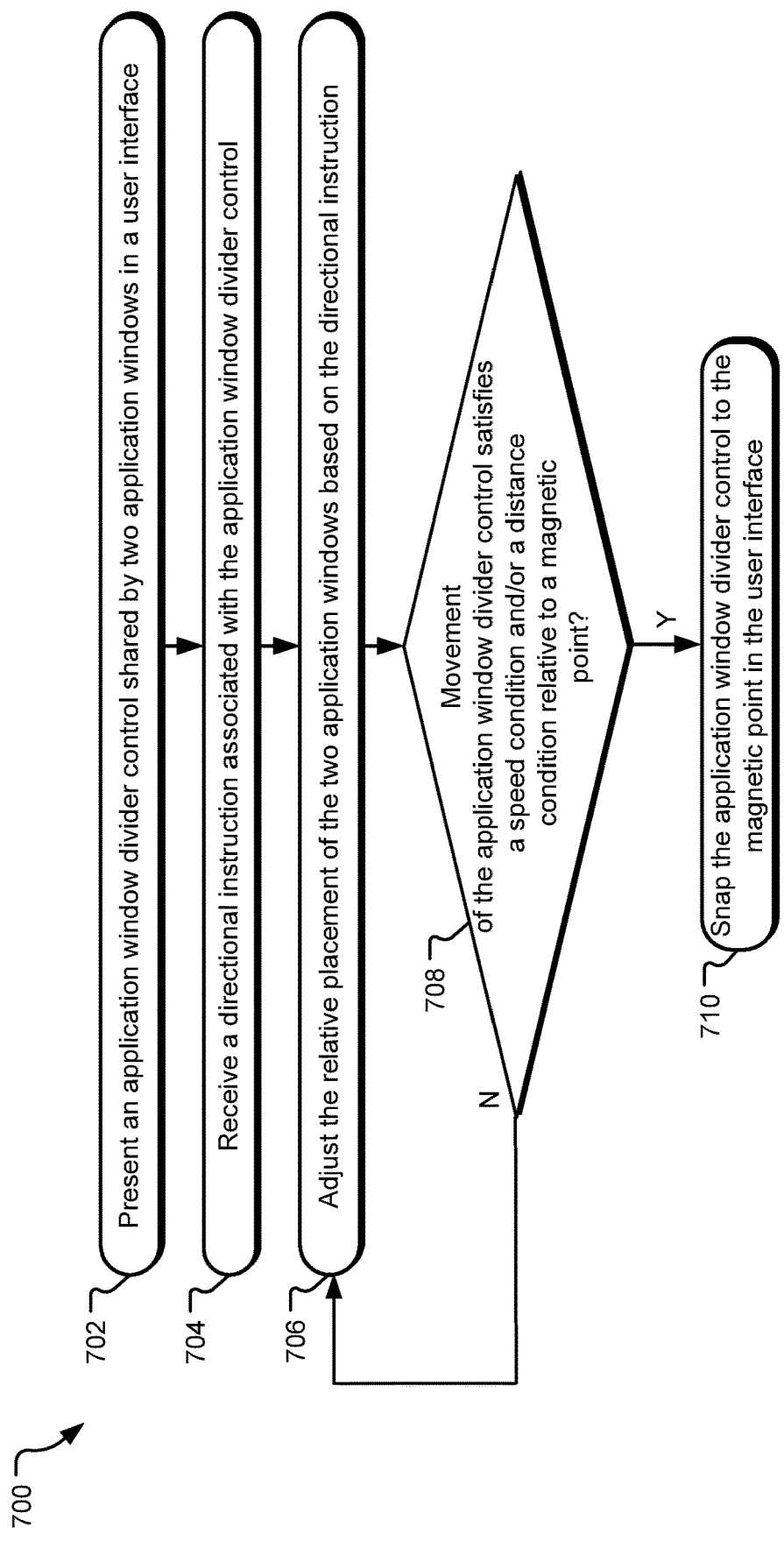
FIG. 7 illustrates example operations for operating an application window divider control relative to a magnetic point in an example user interface.

FIG. 7 illustrates example operations 700 for operating an application window divider control relative to a magnetic point in an example user interface. A presenting operation 702 presents an application window divider control shared by two application windows in a user interface. In one implementation, the application window divider control separates or acts as a boundary between the two application windows. An instruction operation 704 receives a directional instruction (e.g., a drag gesture) in association with the application window divider control. An adjusting operation 706 adjusts the relative placement of the two application windows based on the directional instruction applied to the application window divider control.

A decision operation 708 determines whether movement of the application window divider control satisfies a speed condition and/or a distance condition relative to a magnetic point located along an axis of the user interface. For example, the decision operation 708 may determine that the speed of the application window divider control movement is below a given speed threshold. In another example, the decision operation 708 may determine that the distance between the application window divider control and the magnetic point is below a given distance threshold. In yet another example, the decision operation 708 tests both the speed condition and the distance condition to proceed to a snap operation 710. If the appropriate conditions are not satisfied in the decision operation 708, the adjusting operation 706 continues to adjust the relative placement of the two application windows.

If the appropriate condition or conditions are satisfied in the decision operation 708, the snap operation 710 snaps the application window divider control to the magnetic point in the user interface. In one implementation, the snap operation 710 presents a rapid movement by the application window divider control along the axis from a location that is not aligned with the magnetic point to a location that is aligned with the magnetic point.

It should be understood that such directional instructions, magnetic points, and application window divider controls may be performed, manipulated, or positioned along any axis of the user interface, including without limitation a horizontal axis or a vertical axis.

Figure 8:
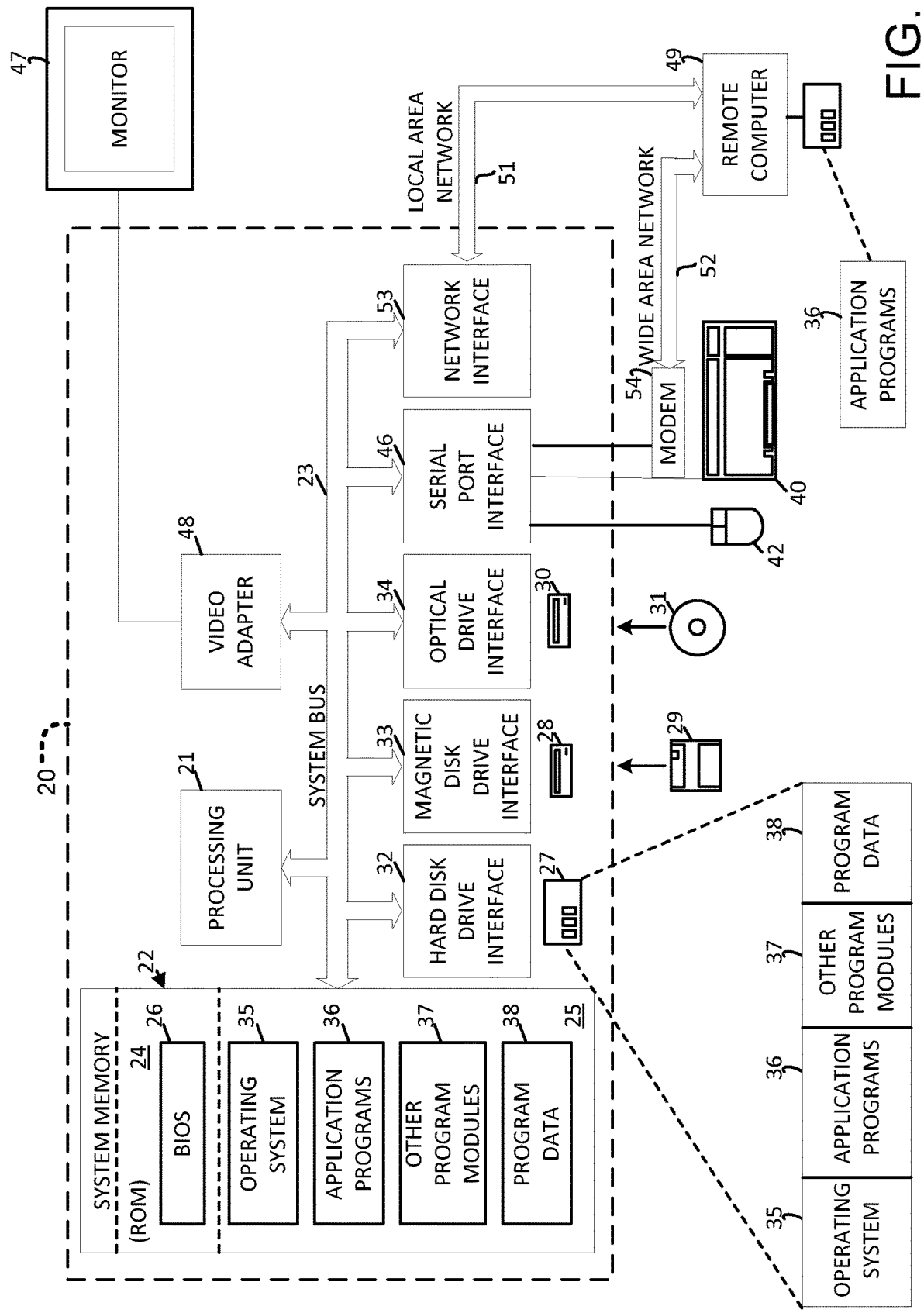
FIG. 8 illustrates an example system that may be useful in implementing the described technology.

FIG. 8 illustrates an example system that may be useful in implementing the described technology. The example hardware and operating environment of FIG. 8 for implementing the described technology includes a computing device, such as general purpose computing device in the form of a gaming console or computer 20, a mobile telephone, a personal data assistant (PDA), a set top box, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a window management system, a magnetic point, an application window divider control, and other instructions and data may be stored in memory 22 and/or storage devices 29 or 31 and processed by the processing unit 21. The user interface data, speed thresholds, distance thresholds, and other data may be stored in memory 22 and/or storage devices 29 or 31 as persistent datastores.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
   presenting a first application window divider control shared by a first application window of a first application and an empty space of a user interface;
   presenting a second application window divider control shared by the empty space and a second application window of a second different application in the user interface;
   receiving a directional instruction that moves at least one of the first application window divider control or the second application window divider control to narrow the empty space to a minimum empty space width;
   in response to receiving the directional instruction, snapping the first application window divider control and the second application window divider control into a single application window divider control; and
   resizing the first application window and the second application window in response to the snapping of the first application window divider control and the second application window divider control into the single application window divider control based on the narrowed empty space.

2. The method of claim 1 wherein a minimum size condition is associated with the first application window and further comprising:
   receiving another directional instruction that moves the single application window divider control along an axis of the user interface towards an end point;
   in response to receiving the other directional instruction, resizing the first application window; and
   in response to the resizing of the first application window satisfying the minimum size condition, removing the first application window from the user interface.

3. The method of claim 1 further comprising:
   presenting a third application window of a third different application that does not share the single application window divider control shared by the first application window and the second application window, the third application window being placed between the first application window and an edge of the user interface;
   presenting another application window divider control shared by the third application window and the first application window;
   receiving another directional instruction that moves the other application window divider control along an axis of the user interface to adjust a size of the third application window;
   in response to receiving the other directional instruction, adjusting placement of the first application window to satisfy a minimum size condition of the first application window; and
   in response to the placement of the first application window satisfying the minimum size condition, adjusting placement of the third application window.

4. The method of claim 3 wherein another minimum size condition is associated with the third application window and further comprising:
   removing the third application window from the user interface when the adjusting placement of the third application window decreases the placement of the third application window to satisfy the other minimum size condition of the third application window.

5. The method of claim 4 wherein the third application window is removed from the user interface with an animation that pushes the third application out of the user interface in the direction of the directional instruction applied to the application window divider control.

6. The method of claim 1 wherein snapping the application window divider control further comprises:
   determining a speed of movement associated with the directional instruction that narrows the empty space; and
   in response to the determined speed of movement satisfying a speed condition relative to the empty space, snapping the first application window divider control and the second application window divider control into the single application window divider control to satisfy the minimum empty space width.

7. The method of claim 1 wherein the snapping of the first application window divider control and the second application window divider control into the single application window divider control further comprises:
   determining a distance associated with the directional instruction that narrows the empty space; and
   in response to the determined distance satisfying a distance condition relative to the minimum empty space width, snapping the first application window divider control and the second application window divider control into the single application window divider control.

8. The method of claim 2 wherein the end point is dynamically calculated during the directional instruction.

9. One or more hardware computer memories storing computer-executable instructions for executing on a computer system a computer process, the computer process comprising:
   presenting a first application window divider control shared by a first application window of a first application and an empty space of a user interface;

presenting a second application window divider control shared by the empty space and a second application window of a second different application in the user interface;

receiving a directional instruction that moves at least one of the first application window divider control or the second application window divider control to narrow the empty space to a minimum empty space width;

responsive to receiving the directional instruction, snapping the first application window divider control and the second application window divider control into a single application window divider control; and resizing the first application window and the second application window in response to the snapping of the first application window divider control and the second application window divider control into the single application window divider control based on the narrowed empty space.

10. The one or more hardware computer memories of claim 9 wherein a minimum size condition is associated with the first application window and the computer process further comprises:

receiving another directional instruction that moves the single application window divider control along an axis of the user interface towards an end point;

in response to receiving the other directional instruction, resizing the first application window; and in response to the resizing of the first application window satisfying the minimum size condition, removing the first application window from the user interface.

11. The one or more hardware computer memories of claim 9 wherein the computer process further comprises:

presenting a third application window of a third different application that does not share the single application window divider control shared by the first application window and the second application window, the third application window being placed between the first application window and an edge of the user interface;

presenting another application window divider control shared by the third application window and the first application window;

receiving another directional instruction that moves the other application window divider control along an axis of the user interface to adjust a size of the third application window;

in response to receiving the other directional instruction, adjusting placement of the first application window to satisfy a minimum size condition of the first application window; and in response to the placement of the first application window satisfying the minimum size condition, adjusting placement of the third application window.

12. The one or more hardware computer memories of claim 11 wherein another minimum size condition is associated with the third application window and the computer process further comprises:

removing the third application window from the user interface when the adjusting placement of the third application window decreases the placement of the third application window to satisfy the other minimum size condition of the third application window.

13. The one or more hardware computer memories of claim 12 wherein the third application window is removed from the user interface with an animation that pushes the third application out of the user interface in the direction of the directional instruction applied to the application window divider control.

14. The one or more hardware computer memories of claim 9 wherein snapping the application window divider control further comprises:

determining a speed of movement associated with the directional instruction that narrows the empty space; and in response to the determined speed of movement satisfying a speed condition relative to the empty space, snapping the first application window divider control and the second application window divider control into the single application window divider control to satisfy the minimum empty space width.

15. The one or more hardware computer memories of claim 14 wherein the snapping of the first application window divider control and the second application window divider control into the single application window divider control further comprises:

determining a distance associated with the directional instruction that narrows the empty space; and in response to the determined distance satisfying a distance condition relative to the minimum empty space width, snapping the first application window divider control and the second application window divider control into the single application window divider control.

16. The one or more hardware computer memories of claim 10 wherein the end point is dynamically calculated during the directional instruction.

17. A system comprising:

a computing device presenting a user interface; and a window management system of an operating system of the computing device, the window management system including a first application window divider control shared by a first application window of a first application and an empty space of the user interface, and a second application window divider control shared by the empty space and a second application window of a second different application in the user interface, the window management system configured to receive a directional instruction applied to a first application window divider control that moves the first application window divider control along an axis of the user interface to narrow the empty space to a minimum empty space width, in response to receiving the directional instruction, snap the first application window divider control and the second application window divider control into a single application window divider control displayed between the first application window and the second application window, the window management system further configured to resize the first application window and the second application window in response to the snapping of the first application window divider control and the second application window divider control into the single application window divider control based on the narrowed empty space.

18. The system of claim 17 wherein the first application window includes a minimum size condition, the window management system further configured to remove the first application window from the user interface in response to the resized first application window satisfying the minimum size condition.

19. The system of claim 17 wherein the window management system is further configured to present a third application window that does not share the first application window divider control, the third application window being placed between the first application window and an edge of the user interface, and present a second application window divider control between the third application window and the first application window.

20. The system of claim 17 wherein the window management system is further configured to determine a speed associated with the directional instruction, and in response to the determined speed satisfying a speed condition, snap the first application window divider control to the snapping point along the axis.

* * * * *